J. G. MOOMY.
PATCH FOR PNEUMATIC TIRES.
APPLICATION FILED APR. 16, 1915.

1,219,577.

Patented Mar. 20, 1917.

Witnesses
B. M. Hartman
J. T. Griffiths

Inventor
Joseph G. Moomy
By
Attorney

UNITED STATES PATENT OFFICE.

JOSEPH G. MOOMY, OF ERIE, PENNSYLVANIA.

PATCH FOR PNEUMATIC TIRES.

1,219,577. Specification of Letters Patent. Patented Mar. 20, 1917.

Application filed April 16, 1915. Serial No. 21,634.

*To all whom it may concern:*

Be it known that I, JOSEPH G. MOOMY, a citizen of the United States, residing at Erie, in the county of Erie and State of Pennsylvania, have invented new and useful Improvements in Patches for Pneumatic Tires, of which the following is a specification.

This invention relates to patches for pneumatic tires and consists in certain improvements in the construction thereof as will be hereinafter fully described and pointed out in the claims.

The invention is particularly designed for patches for inner tubes for pneumatic tires. In making perfect patches for the tube it is desirable that the material of which they are formed be plastic so as to readily conform to the tube and adhesive so as to adhere perfectly to the tube. This can be accomplished under some circumstances by the utilization of a non-vulcanized compound. The difficulty with these compounds is that they flow under the pressure of the tube so that there is an adhesion between the tube and the gum or compound and the gum or compound and the casing of the tire. One of the purposes of the present invention is to provide a patch using these compounds and obviating the difficulties above mentioned.

The invention is illustrated in the accompanying drawings as follows:—

Figure 1:
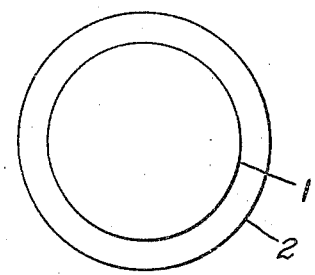

Figure 1 shows a plan view of the patch.

Figure 2:
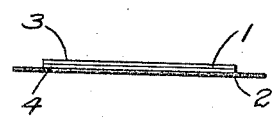

Fig. 2 a side elevation.

Figure 3:
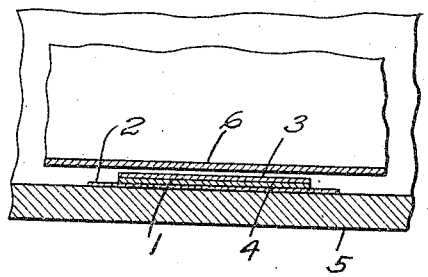

Fig. 3 a section of a fragment of a tire and inner tube showing the position of the parts prior to inflation of the inner tube.

Figure 4:
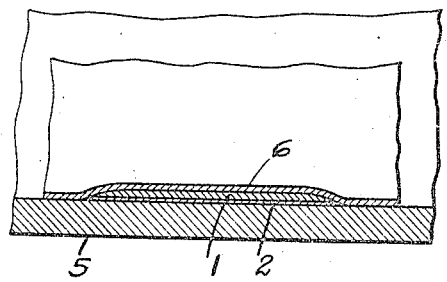

Fig 4 a similar section showing the position of the parts subsequent to the inflation of the inner tube.

1 marks the body of the patch which is made of a non-vulcanized compound and 2 a backing ordinarily of glazed fabric. The glazed fabric extends beyond the rubber compound a sufficient distance to form a dam when the parts are subjected to pressure preventing the outflowing of the rubber compound. The position assumed by the parts under pressure is shown in Fig. 4. In the drawings Figs. 3 and 4 the tire casing is marked 5 and the inner tube 6. Observing Fig. 5 it shows the patch in the position it assumes prior to inflation. In Fig. 4 it shows the position of the parts after inflation. The extended edge of the glazed fabric 2 forms a dam which in contact with the inner tube as it is forced against it prevents the spreading of the compound to a point outside of the glazed fabric.

The rubber compound may be varied. Preferably it is not only non-vulcanized but non-vulcanizing. One example of such compound is Pará gum, gutta-percha, equal portions, and a suitable filling such as whiting. This compound will become very soft and tacky on the application of gasolene or some other solvent but when the gasolene evaporates and becomes dry it is quite firm. In using this patch gasolene is applied to the patch so as to soften the material so that it can readily stick to the tube. The glazed fabric prevents the flowing of the soft gum under the pressure of the inner tube to a point beyond the glazed fabric. In this way the objection to this material for a patch is obviated.

I prefer to form the body of the compound of materials of varying consistency making the surface of greater plasticity and adhesiveness. This may be done by making a compound of two layers 3 and 4, 4 of the compound above described and the face 3 of Pará gum alone with a filler. Other materials than glazed fabric may be used for the backing so long as it extends far enough and has sufficient strength to form a dam at the edge.

What I claim as new is:—

1. A patch for pneumatic tires comprising a layer of non-vulcanized rubber compound; and a backing of non-adhesive material extending outside of the edge of the layer of compound and forming a dam when under pressure confining the rubber compound, each of the component parts being initially in a layer in a separate plane.

2. A patch for pneumatic tires comprising a body of non-vulcanized rubber compound having its face of greater plasticity and adhesiveness when dry than the back face of such compound; and a backing on the back face of the compound of non-adhesive material extending outside the edge of the layer of compound and forming a dam when under pressure confining the compound, each of the component parts being initially in a layer in a separate plane.

In testimony whereof I have hereunto set my hand in the presence of two subscribing witnesses.

JOSEPH G. MOOMY.

Witnesses:
THOMAS C. MILLER,
B. M. HARTMAN.